United States Patent
Hein

[15] 3,680,641
[45] Aug. 1, 1972

[54] WEED SPUD
[72] Inventor: Louis T. Hein, 3515 4-Mile Rd., Racine, Wis. 53404
[22] Filed: Sept. 17, 1970
[21] Appl. No.: 72,977

[52] U.S. Cl. .................172/371, 172/18, 254/132, 294/49
[51] Int. Cl. .................................A01b 1/16
[58] Field of Search.................172/371–374, 13, 172/18; 254/132; 294/57; 16/110–112

[56] References Cited

UNITED STATES PATENTS

| | | | |
|---|---|---|---|
| 1,731,174 | 10/1929 | Posey | 294/49 |
| 1,570,191 | 1/1926 | Wyrembek | 294/49 |
| 1,998,314 | 4/1935 | Gilstrap et al. | 254/132 |
| 1,082,802 | 12/1913 | Full | 37/142 |
| 1,245,920 | 11/1917 | Hinthorn | 254/132 |
| 2,969,120 | 1/1961 | Randolph | 172/371 |
| 2,458,989 | 1/1949 | George | 16/110 |
| 1,770,137 | 7/1930 | Husted | 16/111 |
| 3,077,336 | 2/1963 | McClelland | 254/132 |

*Primary Examiner*—Robert E. Pulfrey
*Assistant Examiner*—C. W. Hanor
*Attorney*—Axel H. Johnson

[57] ABSTRACT

A tool for cutting weed roots below the ground surface, having a shank, a cutting edge extending transversely of the shank, the latter being formed of sheet metal and having an inverted U-shaped cross section. A handle is provided which terminates in a resilient knob for added comfort when using the tool.

1 Claim, 9 Drawing Figures

PATENTED AUG 1 1972
3,680,641
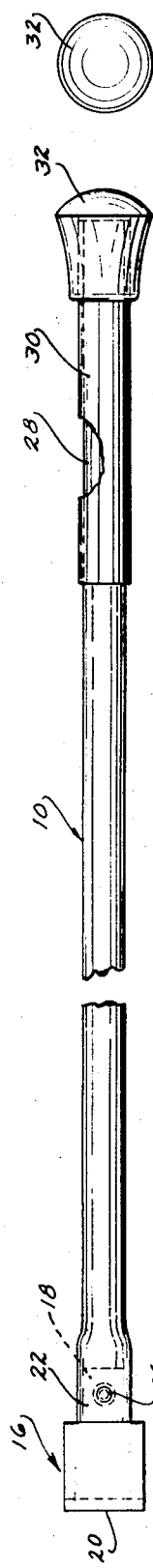
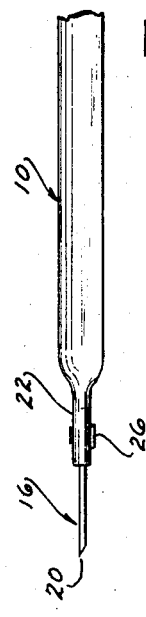
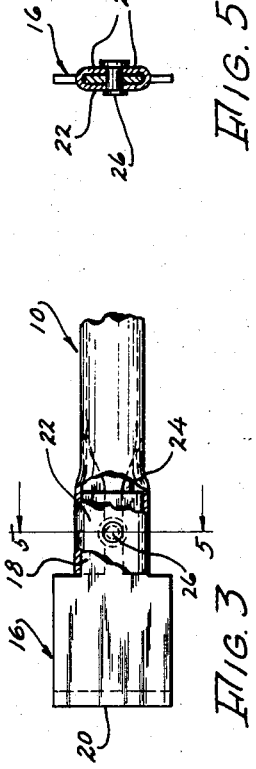
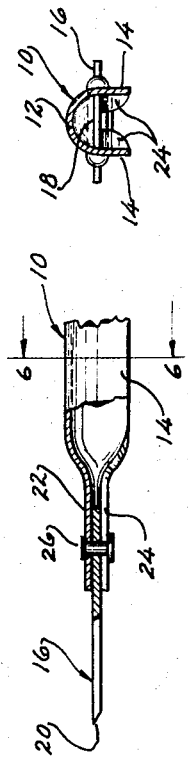
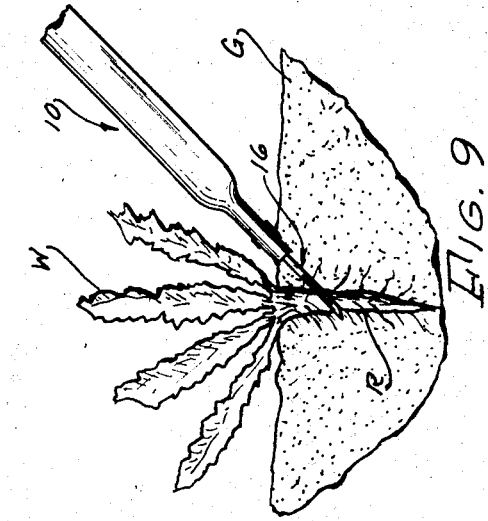
INVENTOR
LOUIS T. HEIN
BY
Axel H. Johnson
AGT.

WEED SPUD

BACKGROUND OF THE INVENTION

1. Field of the Invention

This invention concerns a tool called a spud which is grasped in the hand, and is employed to sever the roots of weeds, such as dandelions, below the surface of the ground as the user walks erect.

2. Description of the Prior Art

The prior art includes similar devices having cutting means provided with a V-shaped notch to embrace the weed being severed.

SUMMARY OF THE INVENTION

This invention comprises a cutting blade secured to one end of a shank. The shank is of a length to permit the user to hold the tool while walking erect, and to force the blade angularly into the ground so as to sever the weed root below the surface of the ground. An object of this invention is to provide a cutting blade that can be easily sharpened.

Another object is to provide a tool having a continuous transverse cutting edge normal to the shank of the tool.

Another object is to provide a spud comprising a shank made of sheet metal formed so as to obtain rigidity consistent with light weight.

Another object is to provide a spud provided with a cushion cap or knob for added comfort for the user.

Further objects and advantages of this invention will become apparent from a consideration of the following detailed description taken in connection with the accompanying drawing wherein an embodiment of the invention is shown. It is however, to be understood that the invention is not limited to the details disclosed, but includes all such variations as fall within the spirit of the invention.

Referring to the drawing:

FIG. 1 is a top, longitudinal view of the spud.

FIG. 2 is an elevational side view of the tool with parts broken away.

FIG. 3 is an enlarged view of the cutting blade showing the means of securing the latter in the shank.

FIG. 4 is a side view of FIG. 3 with parts broken away.

FIG. 5 is a section taken at 5—5 of FIG. 3.

FIG. 6 is a section taken at 6—6 of FIG. 4.

FIG. 7 is an end view of the knob.

FIG. 8 is a section taken at 8—8 of FIG. 2.

FIG. 9 is a view showing the spud in use, and after having severed the root of a weed.

The preferred form of this tool comprises a shank 10 of a convenient length so that the user can walk erect when using it. Shank 10 is of sheet metal, preferably galvanized, and has a rounded inverted U-shaped contour normal to the axis of the shank and designated 12 in FIG. 6, terminating downwardly in walls 14. This construction provides a shank which is light in weight and very rigid. The lower end of shank 10 is provided with a cutting blade 16 of flat steel and having a narrow portion 18. The cutting edge 20 of blade 16 is perpendicular to the shank 10 and is beveled on the lower face at an angle of approximately 30°. Blade 16 is suitably hardened to assure durability. In order to secure blade 16 in the shank 10, the lower end of the latter is formed as at 22 so as to surround the narrow portion 18; the forming terminating as at 24. A rivet 26, in this instance, secures blade 16 integrally with shank 10.

The upper end 28 of shank 10 is formed approximately cylindrical as shown in FIG. 8, and which forming extends from 29 as shown in FIG. 2 and terminates at the upper end of shank 10. The end 28 receives a tubular plastic handle 30 which is a snug fit over the portion 28. In order to provide further comfort to the user, a cap 32 is provided integrally on handle 30.

When the spud is being used, the cap 32 rests in the palm of the hand. The blade 16 is then forced into the ground at an angle to the ground approximately as shown in FIG. 9. The root R of weed W will then be severed as indicated.

The above being a complete description of an illustrative embodiment of the invention, what is claimed as new and desired to be secured by Letters Patent of the United States is:

1. A weed spud, comprising a shank having a longitudinal axis, said shank comprising material formed longitudinally about said axis to define a U-shaped cross-section with the terminal edges of said material defining a longitudinally extending substantial opening, a blade at the extremity of said shank having a transverse cutting edge, said blade extending from said cutting edge and terminating in a portion of reduced width defining transversely extending edges spaced axially from said cutting edge, said shank abutting said transversely extending edges and formed about said axis to intimately surround the periphery of said portion of reduced width, and means securing said blade integrally and axially relative to said shank.

* * * * *